United States Patent [19]

Egawa

[11] Patent Number: 5,181,058
[45] Date of Patent: Jan. 19, 1993

[54] CAMERA HAVING MAGNETIC HEAD FOR DEMAGNETIZING AND RECORDING IN DEMAGNETIZATION PATTERN

[75] Inventor: Akira Egawa, Kanagawa, Japan

[73] Assignee: Canon Kabushiki Kaisha, Tokyo, Japan

[21] Appl. No.: 641,705

[22] Filed: Jan. 15, 1991

[30] Foreign Application Priority Data

Jan. 19, 1990 [JP] Japan .................... 2-11588

[51] Int. Cl.⁵ .................... G03B 17/24; H01F 13/00
[52] U.S. Cl. .................... 354/105; 361/267
[58] Field of Search .............. 354/105, 106; 361/149, 361/151, 267; 335/284; 360/66

[56] References Cited

U.S. PATENT DOCUMENTS

| | | | |
|---|---|---|---|
| 4,384,313 | 5/1983 | Steingroever et al. | 361/149 |
| 4,471,403 | 9/1984 | Dress, Jr. et al. | 361/149 |
| 4,864,332 | 9/1989 | Harvey | 354/21 |
| 4,970,621 | 11/1990 | Gailbreath et al. | 361/149 |
| 5,130,728 | 7/1992 | Goto et al. | 354/105 |
| 5,132,715 | 7/1992 | Taillie | 354/105 |

FOREIGN PATENT DOCUMENTS 60-121447  6/1985  Japan .

Primary Examiner—Michael L. Gellner
Assistant Examiner—J. K. Han
Attorney, Agent, or Firm—Fitzpatrick, Cella, Harper & Scinto

[57] ABSTRACT

A camera arranged to use a film having a magnetic storage part comprises a magnetic head which is arranged to demagnetize a signal pattern previously recorded in the magnetic storage part of the film; and a control circuit which causes the magnetic head to demagnetize the signal pattern previously recorded in the magnetic storage part with a predetermined demagnetization pattern of a frequency lower than the frequency of the signal pattern and to form information to be recorded in the magnetic storage part of the film in the shape of the demagnetization pattern.

6 Claims, 9 Drawing Sheets

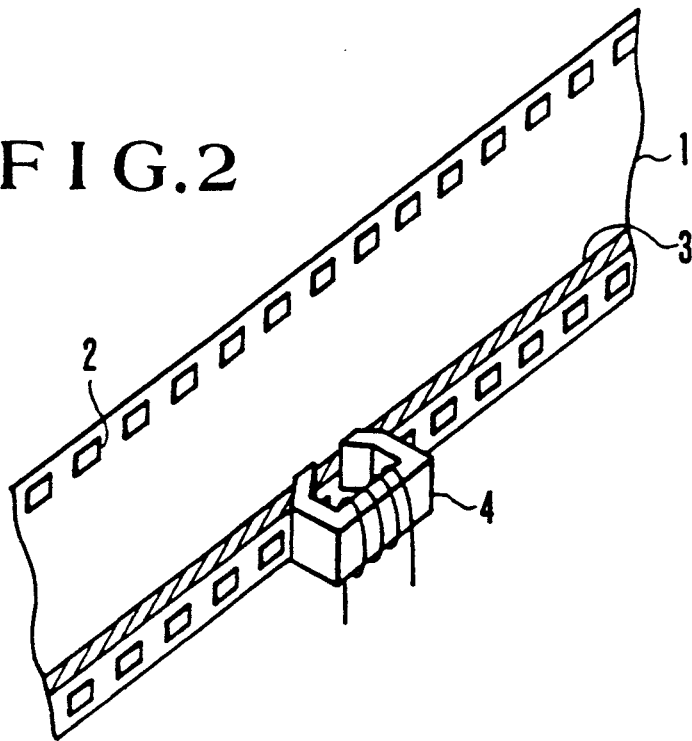
F I G. 2
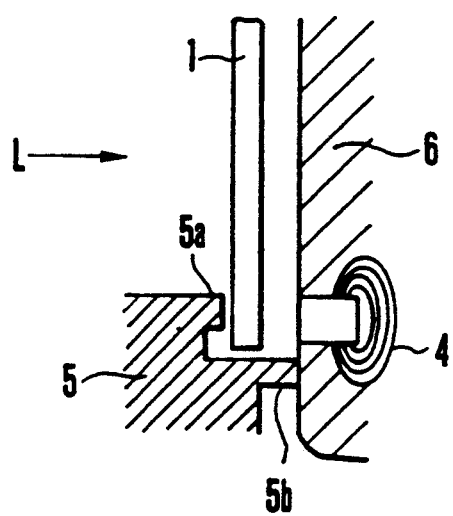
F I G. 3

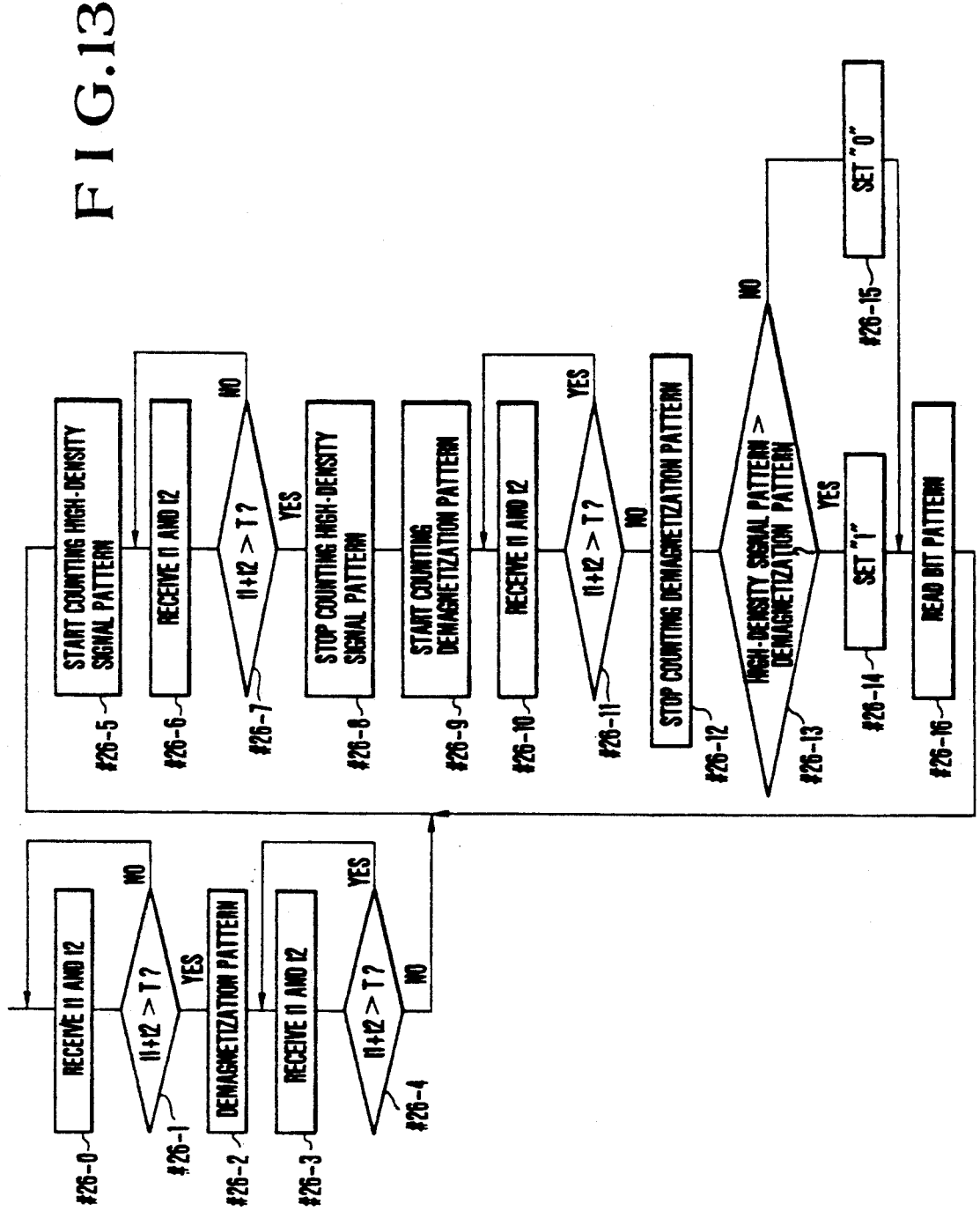
F I G. 13

CAMERA HAVING MAGNETIC HEAD FOR DEMAGNETIZING AND RECORDING IN DEMAGNETIZATION PATTERN

BACKGROUND OF THE INVENTION

1. Field of the Invention

This invention relates to a camera of the kind using a film which is provided with a magnetic storage part and more particularly to an arrangement for recording information in the magnetic storage part.

2. Description of the Related Art

The art of magnetically recording information in a suitable part on the surface of film for cameras using silver-halide photographic films has recently been disclosed in Japanese Laid-Open Patent Application No. SHO 60-121447 and U.S. Pat. No. 4,864,332.

Two methods have been considered to be applicable for the camera of this kind in writing information in the magnetic storage part of the film. In one of the methods, a signal pattern carrying new information is recorded in the magnetic storage part of the film by means of a magnetic head after old information recorded in the magnetic storage part has been completely erased or demagnetized (or degaussed) with the magnetic head. This method requires two steps of operation including a demagnetizing step and a recording step. The other method is called an over-write method. In the over-write method, the signal pattern carrying new information is written also by means of a magnetic head in the magnetic storage part of the film in an overlapping manner without demagnetizing the old information previously recorded in the magnetic storage part. That method utilizes a feature of digital recording in which the recording is performed by plus or minus saturation in such a way as to make the intensity of recording magnetic field larger than that of the saturated magnetic field of a recording medium in use.

In cases where the information recorded in the magnetic storage part is in the form of a dense (high-frequency) signal pattern, both the above-stated two methods necessitate use of a magnetic head which has a small gap and is capable of reading precipitous changes in the signal pattern when reading out the information recorded. However, in that instance, if the information recorded in the magnetic storage part is in the form of a coarse (low-frequency) signal pattern, the magnetic head might fail to read the recorded information, because changes in the signal pattern are moderate.

Therefore, when a film developing facility assumes that the camera writes information in a dense signal pattern in the magnetic storage part of the film, and when the film developing facility is arranged to read the information written in the magnetic storage part with a magnetic head having a small gap which is designed for reading information written in a dense signal pattern from the magnetic storage part of the film, if the information is written by the camera in the magnetic storage part of the film in a coarse signal pattern, the recorded information tends to become hardly reproducible at the film developing facility.

To solve this problem, the information writing magnetic head of the camera must be arranged to be brought into close contact with the film surface for forming a dense signal pattern and also to have a small, fine gap. Such arrangement necessitates the film to be inserted and moved between a pad and the magnetic head. This, however, causes an increase in sliding resistance in feeding the film. Also, it necessitates use of some mechanism for retracting the magnetic head away from the film before inserting the film in between the magnetic head and the pad. This not only increases the size of the camera but also makes the structural arrangement of the camera complex and results in a cost increase.

SUMMARY OF THE INVENTION

This invention is directed to the solution of the above-stated problems. It is, therefore, a principal object of the invention to provide a camera which is of the kind using a film having a magnetic storage part and is simply arranged, without increasing the size and cost thereof, to write and record information in the magnetic storage part of the film in such a way as to permit the film developing facility to reproduce the recorded information without fail. To attain this object, a camera which is arranged according to this invention to use a film having a magnetic storage part comprises: a magnetic head arranged to demagnetize a signal pattern previously recorded in the magnetic storage part of the film; and control means arranged to cause the magnetic head to demagnetize the signal pattern previously recorded in the magnetic storage part of the film with a demagnetization pattern of a frequency lower than the frequency of the recorded signal pattern and to form information to be newly recorded in the magnetic storage part of the film in the shape of the demagnetization pattern.

The above and other objects and features of the invention will become apparent from the following detailed description of embodiments thereof taken in conjunction with the accompanying drawings.

BRIEF DESCRIPTION OF THE DRAWINGS

FIG. 2 is an oblique view showing the magnetic head of the embodiment of the invention in relation to a portion of the film having the magnetic storage part.

FIG. 3 is a sectional view showing in part a camera which includes the magnetic head of FIG. 2.

FIG. 13 is a flow chart showing further details of a part of the flow shown in FIG. 11.

DETAILED DESCRIPTION OF THE PREFERRED EMBODIMENTS

Figures 1A, 1B, 1C, 1D:
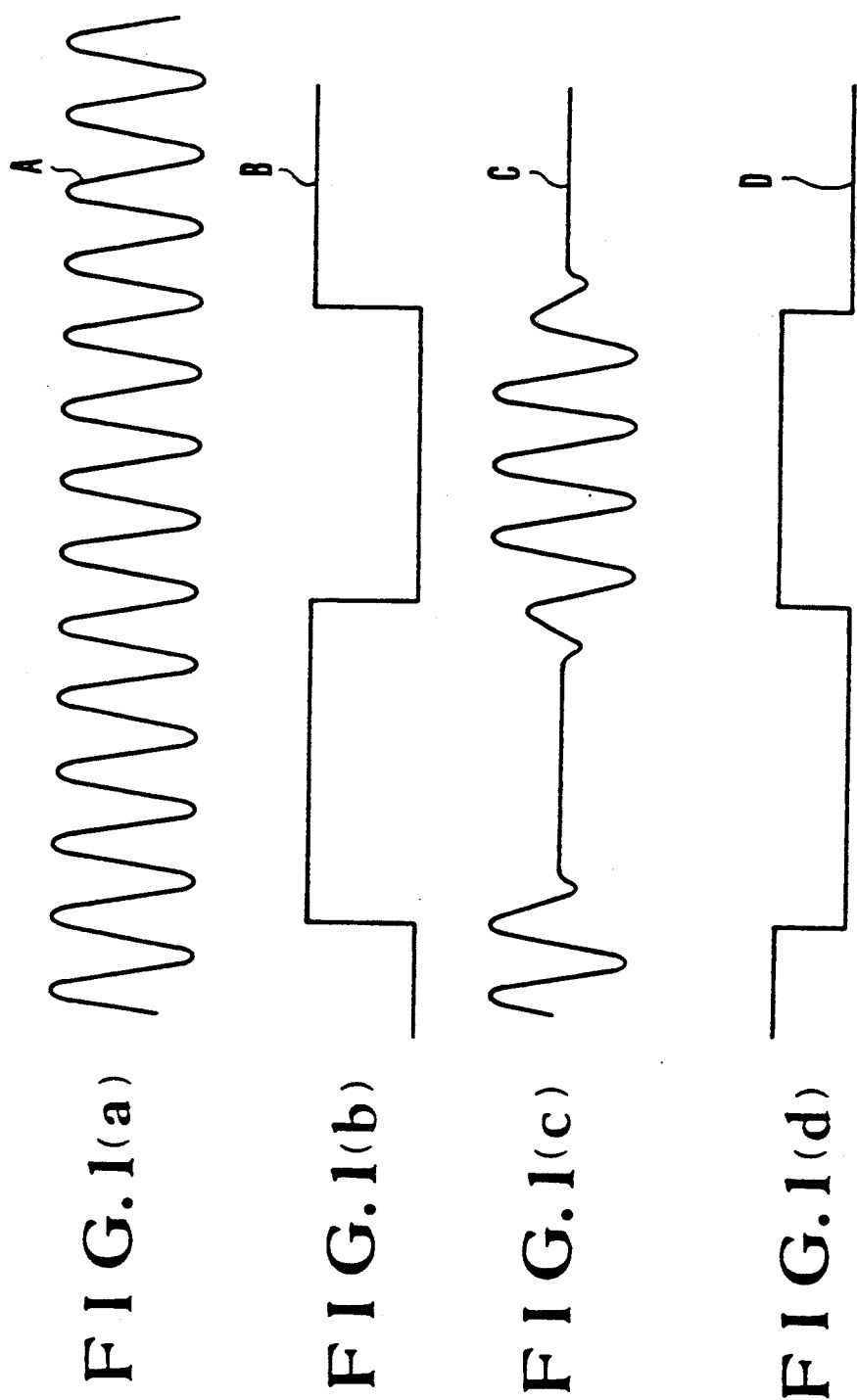
FIGS. 1(a), 1(b), 1(c) and 1(d) show signal patterns in the magnetic storage part of a film used by an embodiment of this invention.

The following describes an embodiment of this invention with reference to the accompanying drawings. FIGS. 1(a) to 1(d) show signal patterns in the magnetic storage part of a film by the embodiment. FIG. 2 is an oblique view showing a magnetic head in relation to a portion of the film where the magnetic storage part is provided. FIG. 3 is a sectional view showing a part of a camera with the magnetic head of FIG. 2 disposed within the camera.

Referring to FIG. 2, the illustration includes a film 1 and known perforations 2 which are formed at a given pitch along both edge parts of the film 1. A magnetic recording track 3 which is arranged as a magnetic storage part on the film 1 has a continuous high-density signal pattern digitally recorded beforehand in a magnetic layer, indicating information on ISO film sensitivity, a number of frames of the film, etc. A magnetic head 4 is provided with a gap which is formed in the direction of orthogonally intersecting the longitudinal direction of the magnetic recording track 3. The magnetic head 4 is arranged to be away from the film 1 at a distance which is about the same as the length of the gap. This arrangement enables the signal pattern recorded in the magnetic recording track 3 to be demagnetized, when a magnetic head is energized with a current.

In FIG. 3, a reference numeral 5 denotes a camera body. An inner rail 5a is provided for restricting the position of the film 1 in the direction of an optical axis. An outer rail 5b is provided for restricting the position of the film 1 in a direction perpendicular to the optical axis. A known pressure plate 6 is arranged to maintain the flatness of the film 1 by pushing and urging it toward the camera body 5 with an elastic material (not shown). The above-stated magnetic head 4 is buried in the pressure plate 6 in a position corresponding to the magnetic recording track 3. Referring to FIG. 3, when a shutter which is not shown is opened, the film 1 is exposed to light in the direction of arrow L.

Next, the magnetic recording method of this embodiment is described as follows: A high-density continuous signal pattern A is previously recorded in the above-stated magnetic recording track 3 of the film 1, as shown in FIG. 1(a). The camera records, in this magnetic recording track 3, a signal pattern B indicating information on a date, a trimming magnification, an aperture value, a shutter time value, a title, etc., as shown in FIG. 1(b). The signal pattern B is sufficiently coarse as compared with the signal pattern A. The magnetic head 4 performs a magnetic erasing, or demagnetizing, action on the signal pattern A when the signal pattern B is at a high level. As a result of the erasing action, a signal pattern C is formed in the magnetic recording track 3 of the film 1, as shown in FIG. 1(c).

If a signal pattern such as the signal pattern C shown in FIG. 1(c) is detected in reading the information from the magnetic recording track 3 at a film developing facility, an area of the signal pattern where no signal is detected is regarded as a low level record and the rest as a high level record, as shown in FIG. 1(d).

Figure 4:
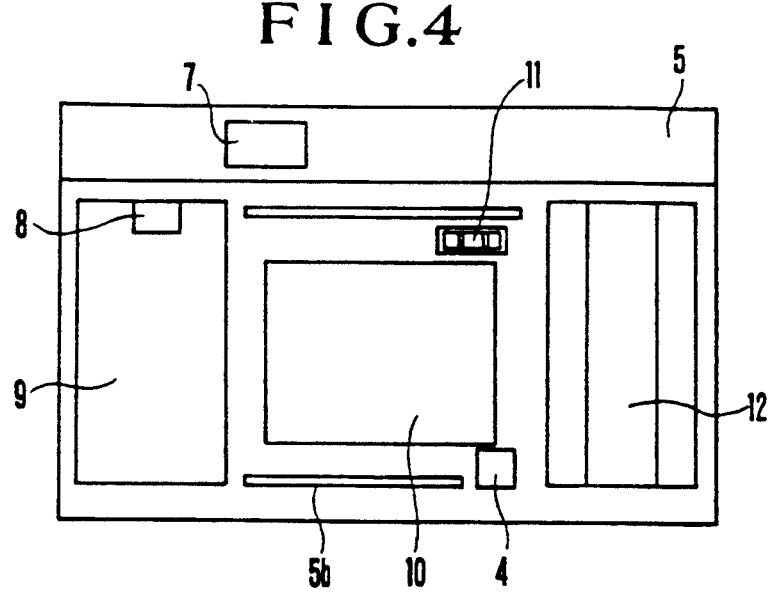
FIG. 4 is a rear view showing the camera of the embodiment with the back cover thereof removed.

FIG. 4 shows a rear view of the camera of this embodiment in a state of having its back cover removed. The illustration includes the camera body 5, a viewfinder 7, a film rewinding fork 8; a film cartridge chamber 9; the outer rail 5b; an aperture 10 which is provided for exposing the film to light; a sprocket 11 which is interlocked with a film moving-extent detecting switch; a film take-up spool 12; and the magnetic head 4.

Figure 5:
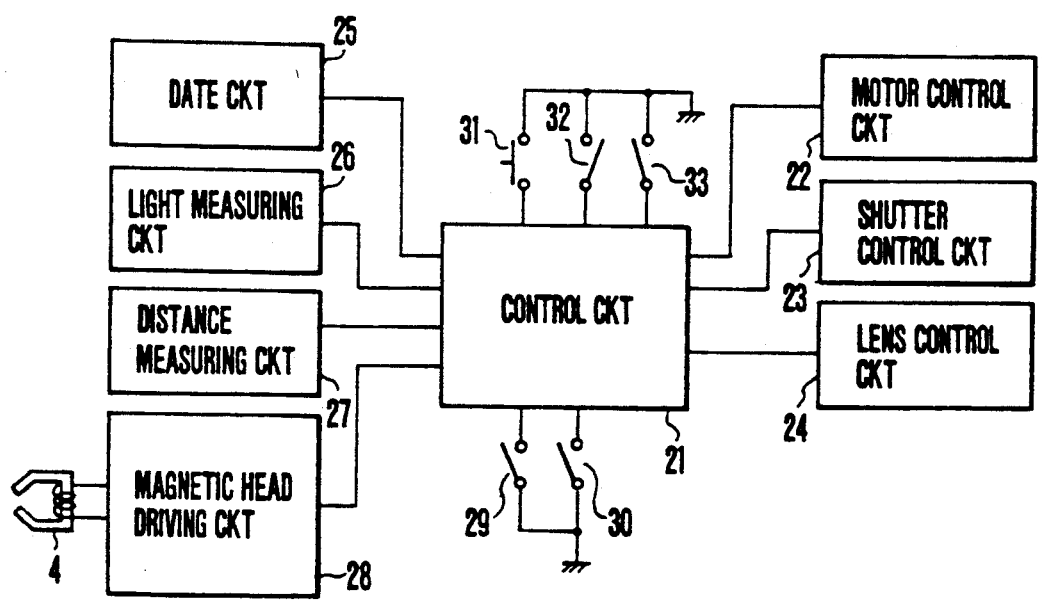
FIG. 5 is a block diagram showing the circuit arrangement of the camera of FIG. 4.

FIG. 5 is a block diagram showing the circuit arrangement of the camera of FIG. 4. Referring to FIG. 5, a date circuit 25 is arranged to count the year, the month and the day. A light measuring circuit 26 is arranged to detect the luminance of an object to be photographed. A distance measuring circuit 27 is arranged to detect a distance to the object. A magnetic head driving circuit 28 is arranged to form a demagnetization (erasing) pattern by driving the magnetic head 4. A back cover switch 29 is arranged to detect the opening and closing movement of the back cover which is not shown. A film switch 30 is arranged to detect the presence or absence of a film cartridge within the film cartridge chamber 9. A release switch 31 is interlocked with the shutter release button of the camera. A sprocket switch 32 is arranged to turn on and off when the sprocket 11 rotates as the film moves. A trimming instruction switch 33 is provided for the purpose of obtaining a trimmed print of picture from the film. A motor control circuit 22 is arranged to control film feeding. A shutter control circuit 23 is arranged to control a film exposure. A lens control circuit 24 is arranged to adjust the focus of the lens to the object. A control circuit 21 which is composed of a microcomputer, etc. is arranged to control the action of each of the above-stated circuits.

Figure 6:
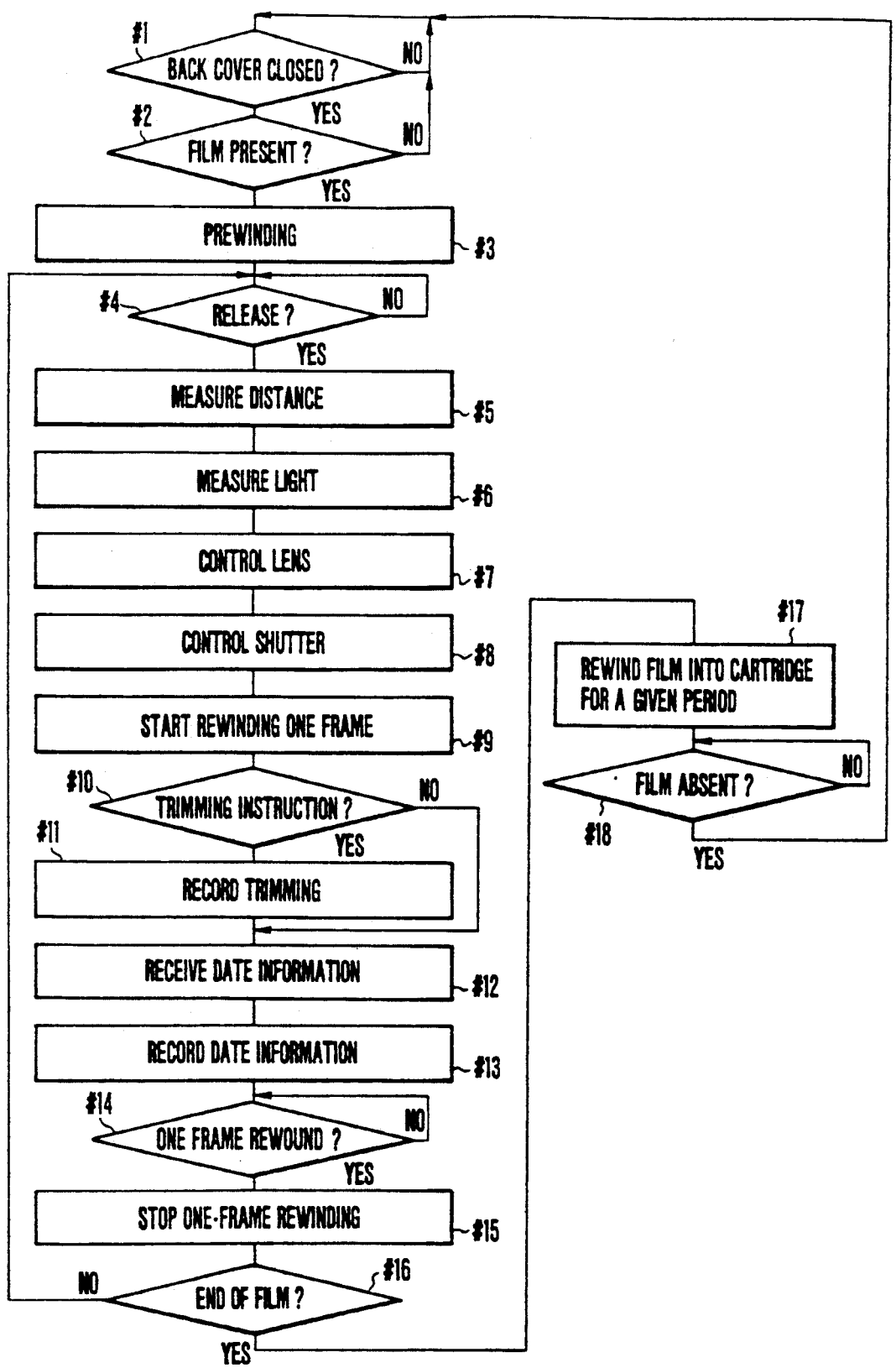
FIG. 6 is a flow chart showing the operation of the circuit shown in FIG. 5.

The camera which is arranged as described above operates as described below with reference to FIG. 6 which is a flow chart:

At a step #1 of FIG. 6: a check is made for the state of the back cover switch 29. If the back cover is found to be closed, the flow of operation (or program) proceeds to a step #2. If the back cover is open, the step #1 is repeated. At the step #2: A check is made for the state of the film switch 30 to find if a film cartridge is placed in the film cartridge chamber 9. If so, the flow proceeds to a step #3. If not, the flow comes back to the step #1. At the step #3: An action of winding the whole film 1 around the spool 12 beforehand which is called "prewinding" is carried out by the motor control circuit 22. At a step #4: A check is made for the state of the release switch 31 to find if the shutter release button has been pushed. If so, the flow proceeds to a step #5. If not, the step #4 is repeated. At the step #5: A distance to the object is obtained by the distance measuring circuit 27. At a step #6: The luminance of the object is obtained by the light measuring circuit 26. At a step #7: The phototaking lens is driven and controlled by the lens control circuit 24 according to the distance to the object obtained at the step #5 in such a way as to adjust the focus to the object. At a step #8: To expose the film 1 to light, the shutter is controlled by the shutter control circuit 23 according to the luminance of the object obtained at the step #6. At a step #9: To rewind one frame portion of film back into the film cartridge, a one-frame film rewinding action is caused to begin by the motor control circuit 22. At steps #10 to #13: The one-frame film rewinding action is controlled in the following manner: At the step #10, a check is made for the state of the trimming switch 33 to find if an instruction for trimming has been given. If so, the flow proceeds to the step #11. At the step #11, the magnetic head 4 is controlled by the magnetic head driving circuit 28 in such a way as to demagnetize the signal pattern of the high-density signal previously recorded in the magnetic recording track 3 of the film 1 with a demagnetization pattern which is sufficiently coarser than the high-density signal pattern. Information on trimming is recorded by means of this demagnetization pattern. The details of the demagnetization pattern will be described later on. At the step #12, date information including the year, month and day is obtained from the date circuit 25. At the step #13, the magnetic head 4 records the date information in the magnetic recording track 3 in the form of a demagnetization pattern in the same manner as at the step #11. The flow then comes to a step #14.

At the step #14: The sprocket switch 32 is checked to find if one frame portion of the film has been rewound. If so, the flow proceeds to a step #15. At the step #15: The film rewinding action is brought to a stop. At a step #16: A check is made to find if all the photographable frame portions of the film has been used. If not, the flow comes back to the step #4. If all the frame portions of the film is found to have been used, the flow proceeds to a step #17. At the step #17: The film is rewound into the film cartridge for a given period of time before the film moving action is brought to a stop. At a step #18: The film switch 30 is checked to find if the film cartridge has been taken out from the film cartridge chamber 9. If so, the flow comes back to the step #1.

Figure 7:
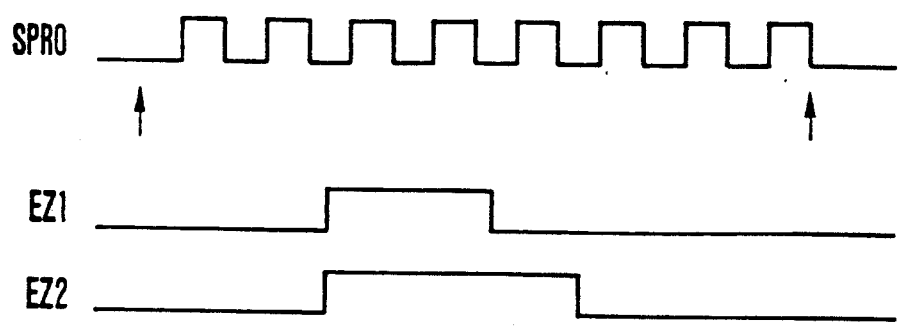
FIG. 7 shows by way of example a demagnetization pattern formed by the embodiment.

FIG. 7 shows by way of example the demagnetization pattern recorded at the step #11 of FIG. 6. In FIG. 7, a reference symbol SPRO denotes the signal output from the sprocket switch 32 which indicates one frame portion of the film. More specifically, this signal consists of eight pulses as the number of perforation holes within one frame portion of the film is eight. A symbol EZ1 denotes a signal indicating a setting value of the trimming magnification. During the period when the signal EZ1 is at a high level, the magnetic head 4 is driven to demagnetize (degauss) the signal pattern of the high-density signal previously recorded in the magnetic recording track 3 of the film with a sufficiently coarse pattern in such a way as to perform the demagnetization corresponding to two crests of the signal SPRO. A symbol EZ2 denotes a signal indicating another setting value of trimming magnification. In the case of this signal EZ2, unlike the signal EZ1, the magnetization corresponding to three crests of the signal SPRO instead of two is performed.

Figure 8:
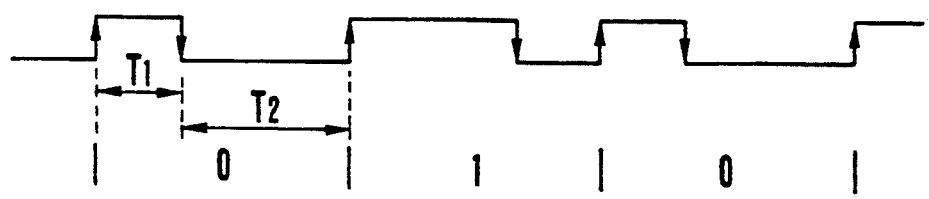
FIG. 8 shows another example of the demagnetization pattern of the embodiment.

FIG. 8 shows the magnetic recording in a demagnetization pattern which is obtained in accordance with a self-clocking method in a case where the magnetic recording by the method shown in FIG. 7 is impossible when the amount of information is great as the trimming information and the date information obtained at the steps #11 and #13 of FIG. 6 are recorded. Referring to FIG. 8, a period of one bit is arranged to be from one rise to the next rise of the signal shown. Either "0" or "1" is considered to be recorded according to whether a fall of the signal takes place within the first half of the period or within the latter half of the period. In other words, "0" or "1" is represented according to a relation in length between time T1 and time T2. Information of many kinds is recordable by varied combinations of them.

Figure 9:
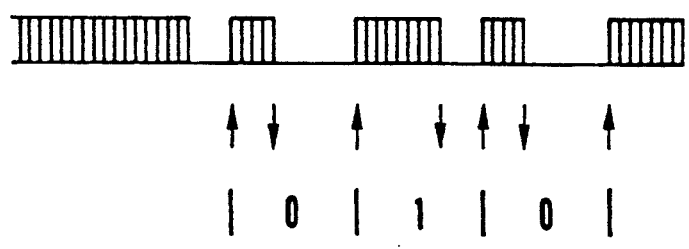
FIG. 9 shows how the demagnetization pattern is recorded in a magnetic recording track on the film.

FIG. 9 shows the state of the demagnetization pattern obtained in the magnetic recording track 3 on the film 1 as a result of demagnetization performed in accordance with the above-stated self-clocking method. Referring to FIG. 9, the state of the record thus obtained is as follows: A demagnetized part (a portion in which a previously recorded high-density signal exits) which is obtained first represents the beginning of data. A magnetized part which comes next represents a rise in the clock signal. A demagnetized part obtained next represents a fall of the data.

Figure 10:
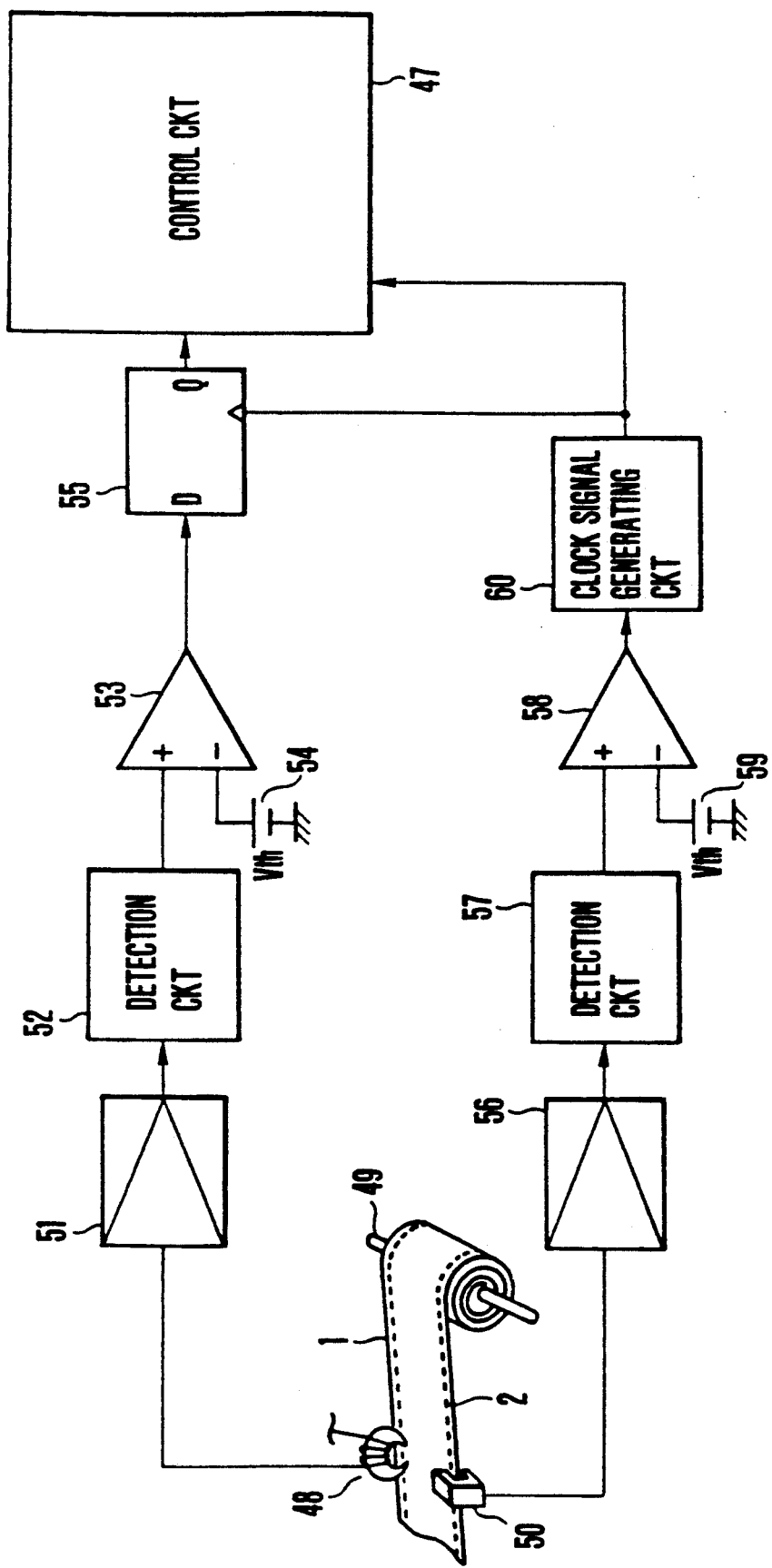
FIG. 10 is a diagram showing by way of example the circuit arrangement of a reproducing device employed by a film developing facility for reading information from the magnetic storage part of the film.

FIG. 10 is a diagram showing by way of example the circuit arrangement of a reproducing apparatus arranged at a film developing facility to read out from the film 1 the information recorded in the magnetic recording track 3 by means of the magnetic head 4 of the camera. Referring to FIG. 10, a control circuit 47 which consists of a microcomputer, etc. is arranged to perform various control actions on the basis of input information of varied kinds. A magnetic head 48 is arranged close to the above-stated film 1 to read out from the magnetic recording track of the film 1 the information recorded in the form of a high-density signal pattern. A shaft 49 is arranged to take up the film thereon. Changes in the signal are detected by the magnetic head 48 as the film 1 is wound around the film take-up shaft 49. A photo-interrupter 50 is arranged to detect the perforations 2 provided in the film 1. The result of detection thus obtained is used for control over a film feeding process. An amplifier 51 is arranged to amplify a weak signal output from the magnetic head 48. A reference numeral 52 denotes a detection circuit. A numeral 53 denotes a comparator. A numeral 54 denotes a reference voltage. A numeral 55 denotes a flip-flop. A digital signal which is output from the comparator 53 as the result of comparison with the reference voltage 54 is supplied to the D terminal of the flip-flop 55. A numeral 56 denotes an amplifier which is arranged to amplify a signal output from the above-stated photo-interrupter 50. A numeral 57 denotes another detection circuit. A numeral 58 denotes another comparator. A numeral 59 denotes another reference voltage. A numeral 60 denotes a clock signal generating circuit. A digital signal which is output from the comparator 58 as the result of comparison with the reference voltage 59 is supplied as a clock signal from the clock signal generating circuit 60 to the control circuit 47 and the flip-flop 55 in synchronism with the information recorded in the magnetic recording track of the film 1. Further, in the case of this embodiment, the perforation 2 of the film 1 is utilized as a clock signal source. However, this may be changed to arrange a roller to be rotatably pushed against the surface of the film and to detect the rotation of the roller by means of a pulse disc.

Figure 11:
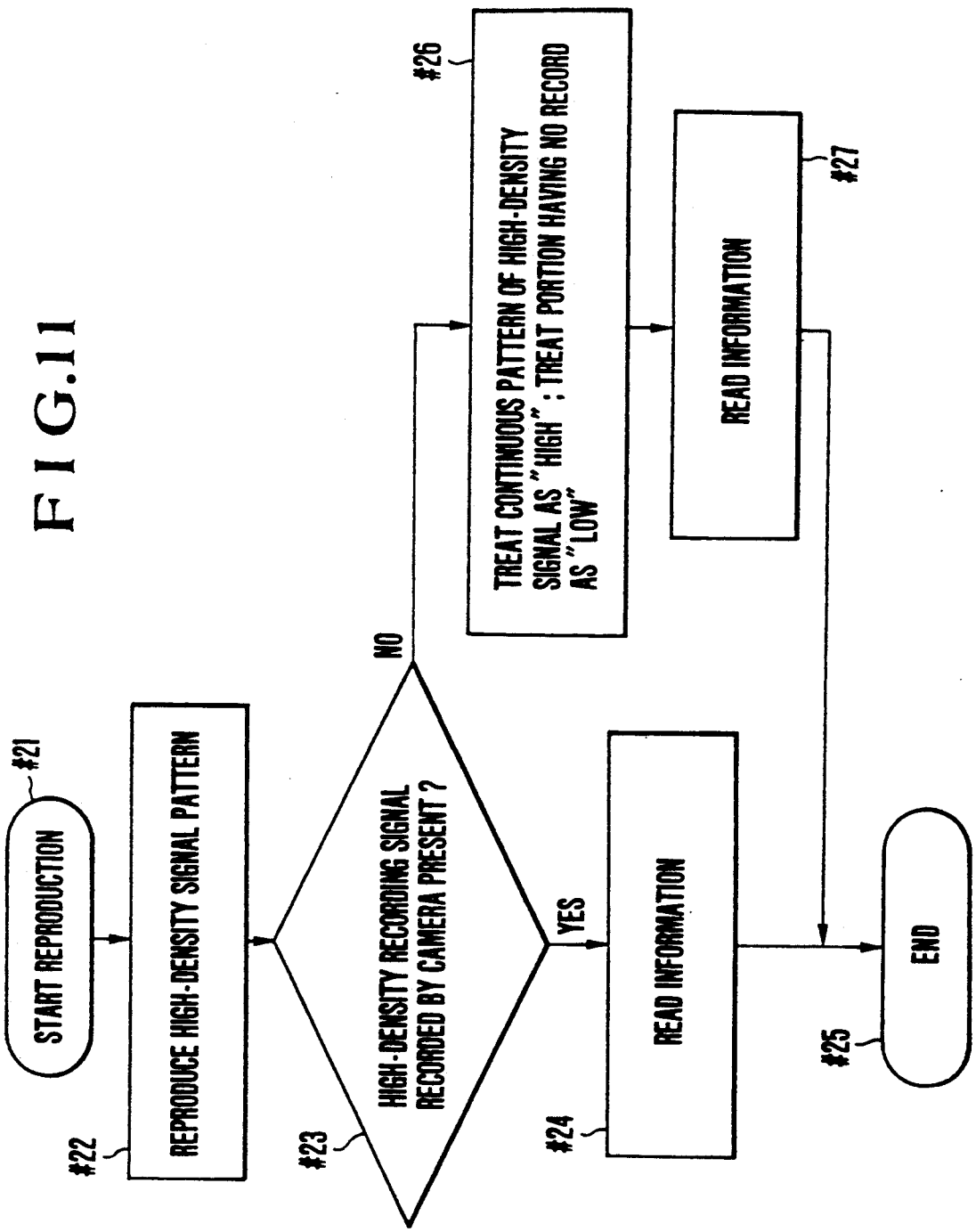
FIG. 11 is a flow chart showing the operation of the circuit of FIG. 10.

FIG. 11 is a flow chart showing the contents of the control circuit 47 shown in FIG. 10, i.e., the reproducing operation to be performed by the circuit of FIG. 10 at the film developing facility. Referring to FIG. 11, the film is set and the reproducing process begins at a step #21. At a step #22: The high-density signal pattern recorded in the magnetic recording track 3 of the film 1 is read. Step #23: A check is made for the presence of a high-density signal recorded by the camera. If the high-density signal recorded by the camera is found, the flow of operation proceeds to a step #24. At the step #24: Information is read and reproduced with a high degree of density. At a step #25: The flow comes to an end. If the high-density signal recorded by the camera is not found at the step #23, the flow comes to a step #26. At the step #26: A continuous pattern of the high-density signal previously recorded on the film 1 is read to be regarded as a high level, while a portion having no record with the high-density signal demagnetized by the camera is read to be regarded as a low level. At a next step #27: The high and low level signals thus obtained are read, and the information which has been recorded in the form of the demagnetization pattern on the side of the camera is reproduced in a coarse signal pattern. The flow then comes to an end at the step #25.

Figure 12:
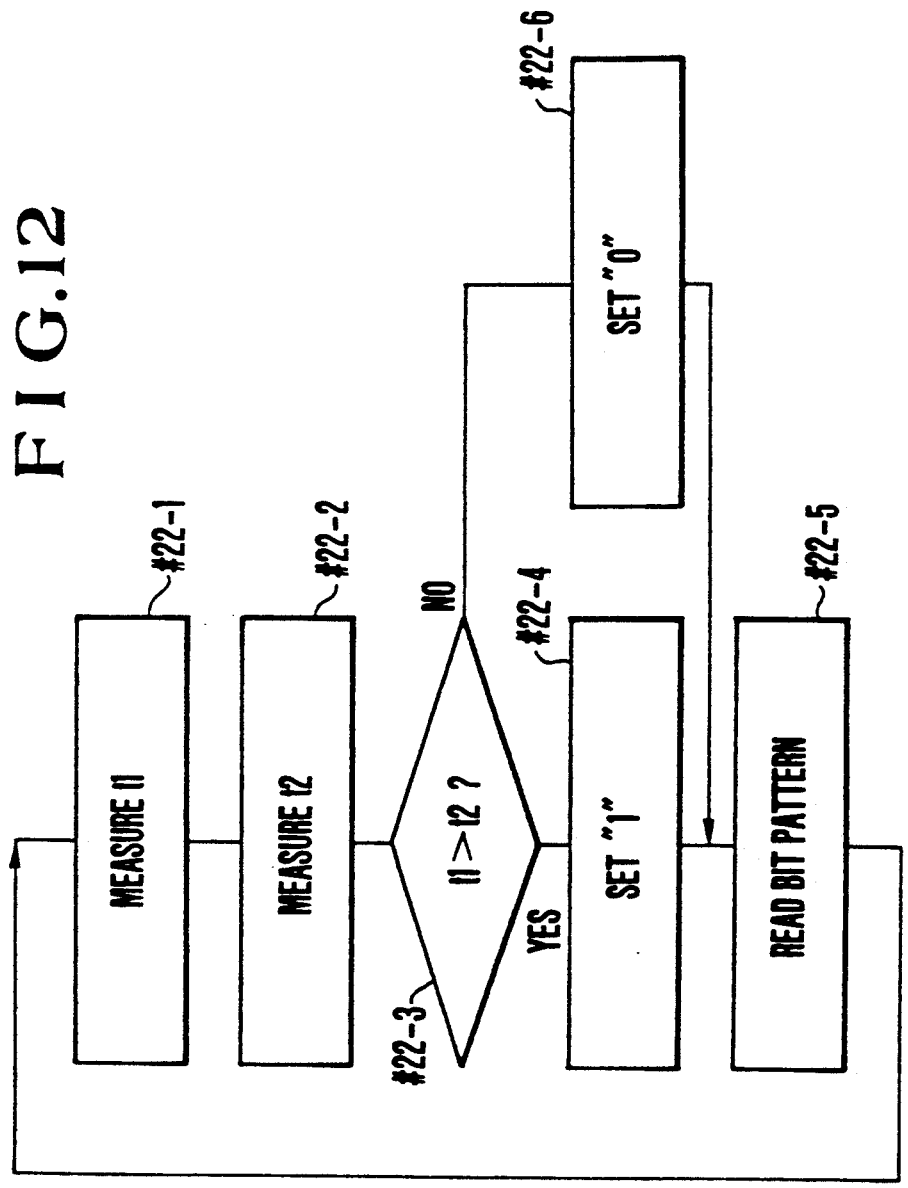
FIG. 12 is a flow chart showing in detail a part of the flow shown in FIG. 11.

FIG. 12 is a flow chart showing the details of the process for reproducing the high-density signal pattern executed at the step #22 of FIG. 11. In this instance, the information which has been recorded in the magnetic recording track 3 of the film 1 in the signal pattern of the self-clocking method is reproduced. Referring to FIG. 12, a period of time t1 from a rise of each pulse of the magnetizing pattern of the high-density signal to the subsequent fall thereof is measured at a step #22-1. At a step #22-2: A period of time t2 from a fall of each pulse of the magnetizing pattern of the high-density signal to the subsequent rise thereof is measured.

At a step #22-3: A check is made to find if the time t1 is longer than the time t2. If so, the flow comes to a step #22-4 to set bit information at "1". If the time t2 is found to be equal to or longer than the time t1, the flow comes to a step #22-6 to set the bit information at "0". The result of this gives information on the signal recorded by the above-stated self-clocking method. At a step #22-5: A bit pattern which is determined in the above-stated manner is serially read. Then, at the step #23 of FIG. 11, the high-density bit pattern thus read is checked to find if there is the information which has been recorded by the camera in the high-density signal pattern in the magnetic recording track 3 of the film 1.

FIG. 13 is a flow chart showing the details of the step #26 of FIG. 11 and showing, like the flow chart of FIG. 12, a reproducing method in cases where information is recorded in the magnetic recording track 3 of the film 1 in the form of the signal pattern of the self-clocking method. At a step #26-0 of FIG. 13: The periods of time t1 and t2 are measured in the same manner as in the steps #22-1 and #22-2 of FIG. 12. At a step #26-1: A check is made to find if the time interval of one bit, i.e., "t1+t2", is longer than a given length of time T, so as to determine the presence or absence of magnetic information of the high-density signal pattern. If "t1+t2" is longer than the given length of time T, the flow of operation proceeds to a step #26-2. At the step #26-2: This part of the signal is considered to be a demagnetization pattern, and the flow proceeds to a step #26-3 At the step #26-3: The data t1 and t2 are received in the same manner as at the step #26-0. The flow comes to a step #26-4. At the step #26-4: The data "t1+t2" is compared with the length of time T. In this flow, a first demagnetization pattern, i.e., the beginning of data, shown in FIG. 9 is detected at the step #26-2. At the step #26-4, if the time "t1+t2" ceases to be longer than the time T, it indicates that the magnetic information of the high-density signal pattern has appeared again. In that case, the flow comes to a step #26-5. At the step #26-5: The length of time for which the high-density signal pattern continues begins to be counted. At a step #26-6: The data t1 and t2 are again received. At a step #26-7: The time "t1+t2" is checked to find if it is longer than the time T. If so, the flow comes to a step #26-8. At the step #26-8: The high-density signal pattern is considered to have come to an end, and the time count is brought to a stop. The flow proceeds to a step #26-9. At the step #26-9: A length of time for which the demagnetization pattern continues begins to be counted. At a step #26-10: The data t1 and t2 are obtained, and the flow comes to a step #26-11. At the step #26-11: The time "t1+t2" is checked to find if it is longer than the time T. If not, the flow comes to a step #26-12. At the step #26-12: The demagnetization pattern is considered to have come to an end, and the time count is brought to a stop. At a step #26-13: The duration of the high-density signal pattern found at the step #26-8 and that of the demagnetization pattern are compared with each other to find if the former is longer than the latter. If so, the flow comes to a step #26-14 to set the bit information at "1". If not, the flow comes to a step #26-15 to set the bit information at "0". The flow then comes to a step #26-16 to serially read the bit information thus obtained.

This invention is not limited to the embodiment described in the foregoing. The embodiment can be variously changed. For example, information on a certain matter may be included in the continuous signal recorded beforehand in the magnetic recording track (or magnetic storage part) on the film. In this instance, if a reading magnetic head is provided, it enables the embodiment to read out the signal of previously recorded information before writing information. Further, a known permanent magnet may be used in demagnetizing or erasing information recorded on the film. In that instance, the permanent magnet must be moved away from the film surface if no demagnetizing action is required. Although the use of the permanent magnet necessitates the provision of a retracting mechanism, it permits simplification of the electrical circuit arrangement within the camera.

Further, in the embodiment described, the magnetic head is arranged such that a line connecting the opposed parts thereof is in parallel to the surface of the film. However, this arrangement may be changed to perform magnetic recording with the film inserted in a gap between the opposed parts and to energize the magnetic head as the film is fed.

In the case of the embodiment described, the invention is applied to a camera arranged to use a film which is provided with a magnetic storage part. However, the invention is of course likewise applicable to signal recording which differs from magnetic recording and to apparatuses other than cameras.

The camera which is of the kind using a film having a magnetic storage part and embodies this invention as described in the foregoing is arranged to demagnetize a signal pattern previously recorded in the magnetic storage part of the film by using a predetermined demagnetization pattern which is of a frequency sufficiently lower than that of the signal pattern; to form information to be recorded in the storage part with the demagnetization pattern.

The invented arrangement obviates the necessity of bringing the magnetic head into close contact with the film surface. This lessens the sliding resistance which takes place in feeding the film. Further, since the magnetic head is always not in contact with the film, it dispenses with a mechanism required for retracting the magnetic head away from the film. Therefore, the invented arrangement not only simplifies the structural arrangement of the camera but also permits reduction in size and cost thereof. Further, since the invention does not require a high degree of magnetic recording accuracy for the magnetic storage part of the film, the invention permits use of a magnetic head which does not have a high degree of accuracy and is available at a low price. Further, the use of the above-stated reading magnetic head in addition to the non-contact magnetic head permits more effective utilization of information recorded on the film.

What is claimed is:

1. A camera adapted to use a film having a magnetic storage part, comprising:
   a) a magnetic head arranged to demagnetize a signal pattern previously recorded in the magnetic storage part of the film; and
   b) control means for causing said magnetic head to demagnetize the signal pattern previously recorded in the magnetic storage part of the film with a predetermined demagnetization pattern which is of a frequency lower than that of the signal pattern, and for forming information to be recorded in the magnetic storage part of the film in the demagnetization pattern.

2. A camera according to claim 1, wherein said control means includes means for making the frequency of the demagnetization pattern sufficiently lower than the frequency of said signal pattern previously recorded in the magnetic storage part of the film.

3. A camera adapted to use a film having a magnetic storage part, comprising:
   a) a magnetic head arranged to demagnetize a signal pattern previously recorded in the magnetic storage part of the film; and
   b) control means for causing said magnetic head to demagnetize the signal pattern previously recorded in the magnetic storage part of the film with a predetermined demagnetization pattern, and for forming information to be recorded in the magnetic storage part of the film in the demagnetization pattern.

4. An apparatus for a camera adapted to use a film having a magnetic storage part, comprising:
   a) a magnetic head arranged to demagnetize a signal pattern previously recorded in the magnetic storage part of the film; and
   b) control means for causing said magnetic head to demagnetize the signal pattern previously recorded in the magnetic storage part of the film with a predetermined demagnetization pattern which is of a frequency lower than that of the signal pattern, and for forming information to be recorded in the magnetic storage part of the film in the demagnetization pattern.

5. An apparatus for a camera according to claim 4, wherein said control means includes means for making the frequency of the demagnetization pattern sufficiently lower than the frequency of said signal pattern previously recorded in the magnetic storage part of the film.

6. An apparatus for a camera adapted to use a film having a magnetic storage part, comprising:
   a) a magnetic head arranged to demagnetize a signal pattern previously recorded in the magnetic storage part of the film; and
   b) control means for causing said magnetic head to demagnetize the signal pattern previously recorded in the magnetic storage part of the film with a predetermined demagnetization pattern, and for forming information to be recorded in the magnetic storage part of the film in the demagnetization pattern.

* * * * *

UNITED STATES PATENT AND TRADEMARK OFFICE
CERTIFICATE OF CORRECTION

PATENT NO. : 5,181,058
DATED : January 19, 1993
INVENTOR(S) : Egawa

It is certified that error appears in the above-identified patent and that said Letters Patent is hereby corrected as shown below:

On title page, item
[75] Inventor:

"Kanagawa" should read --Kawasaki--.

COLUMN 5:

Line 17, "has" should read --have--;
Line 19, "is" should read --are--; and
Line 68, "exits" should read --exists)--.

COLUMN 7:

Line 46, "#26-3 At" should read --#26-3.  At--.

Signed and Sealed this

Eighteenth Day of January, 1994

Attest:

BRUCE LEHMAN

Attesting Officer    Commissioner of Patents and Trademarks